United States Patent
Walter et al.

(10) Patent No.: US 6,952,423 B1
(45) Date of Patent: Oct. 4, 2005

(54) TELECOMMUNICATIONS EQUIPMENT

(75) Inventors: Olivier Walter, Versailles (FR); Hélène Bachatene, Paris (FR)

(73) Assignee: Alcatel, Paris (FR)

( * ) Notice: Subject to any disclaimer, the term of this patent is extended or adjusted under 35 U.S.C. 154(b) by 665 days.

(21) Appl. No.: 09/688,711

(22) Filed: Oct. 17, 2000

(30) Foreign Application Priority Data

Oct. 28, 1999 (FR) .................................. 99 13498

(51) Int. Cl.$^7$ ............................ H04L 12/28; H04J 3/24; H04M 7/00
(52) U.S. Cl. ........................ 370/410; 370/254; 370/474; 379/229
(58) Field of Search ................................ 370/410, 467, 370/401, 409, 229–254, 376–395, 474–522; 379/229–242, 379/201–221; 709/238–253; 455/410–435, 455/552

(56) References Cited

U.S. PATENT DOCUMENTS

| | | | |
|---|---|---|---|
| 5,239,542 A * | 8/1993 | Breidenstein et al. ....... | 370/376 |
| 5,793,771 A * | 8/1998 | Darland et al. ............. | 370/467 |
| 5,852,660 A * | 12/1998 | Lindquist et al. ........... | 379/230 |
| 5,933,784 A * | 8/1999 | Gallagher et al. ........ | 455/552.1 |
| 6,108,341 A * | 8/2000 | Christie ....................... | 370/410 |
| 6,181,703 B1 * | 1/2001 | Christie et al. ............. | 370/410 |
| 6,252,858 B1 * | 6/2001 | Inoue .......................... | 370/254 |
| 6,269,252 B1 * | 7/2001 | Hutchings et al. .......... | 455/552 |
| 6,282,202 B1 * | 8/2001 | Mainwaring et al. ....... | 370/410 |
| 6,363,431 B1 * | 3/2002 | Hammer et al. ............ | 709/249 |
| 6,493,353 B2 * | 12/2002 | Kelly et al. ................. | 370/467 |
| 6,515,997 B1 * | 2/2003 | Feltner et al. .............. | 370/401 |
| 6,522,876 B1 * | 2/2003 | Weiland et al. ............. | 445/414 |
| 6,560,327 B1 * | 5/2003 | McConnell .................. | 379/229 |
| 6,563,835 B1 * | 5/2003 | Chen .......................... | 370/410 |
| 6,785,229 B1 * | 8/2004 | McNiff et al. .............. | 370/230 |
| 6,807,150 B1 * | 10/2004 | McNiff et al. .............. | 370/230 |

FOREIGN PATENT DOCUMENTS

EP        0 530 443 A2     10/1993

\* cited by examiner

*Primary Examiner*—Man U. Phan
(74) *Attorney, Agent, or Firm*—Sughrue Mion, PLLC

(57) ABSTRACT

The invention relates to telecommunications equipment including a service unit. According to the invention, the service unit includes a driver core and modules connected to the driver core and adapted to process signaling, and the driver core: receives signaling messages from one or more signaling networks, and sends the signaling messages to the modules in accordance with a predetermined rule.

2 Claims, 2 Drawing Sheets

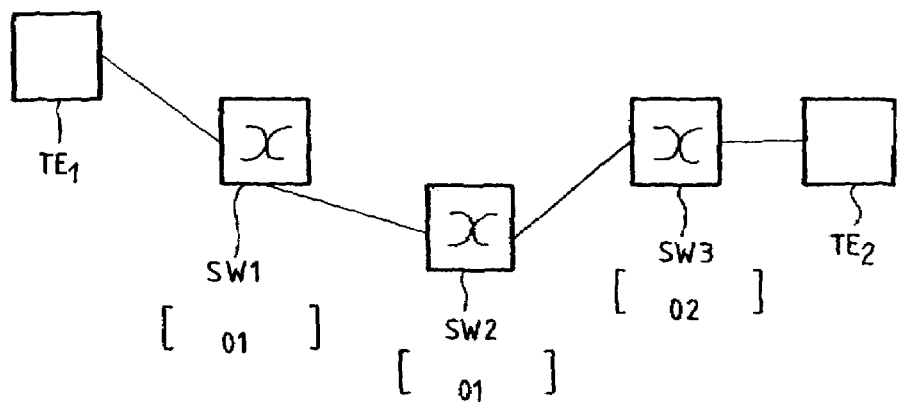
FIG_1  PRIOR ART
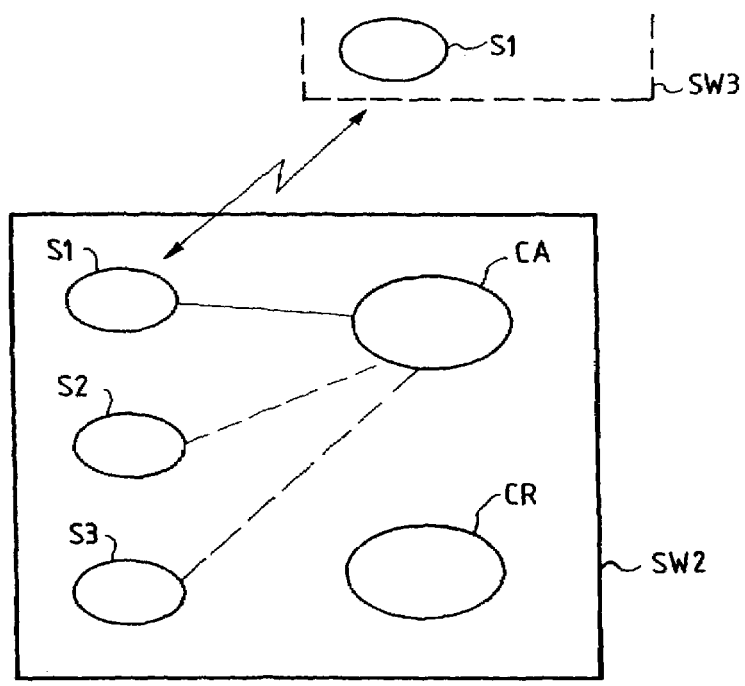
FIG_2  PRIOR ART

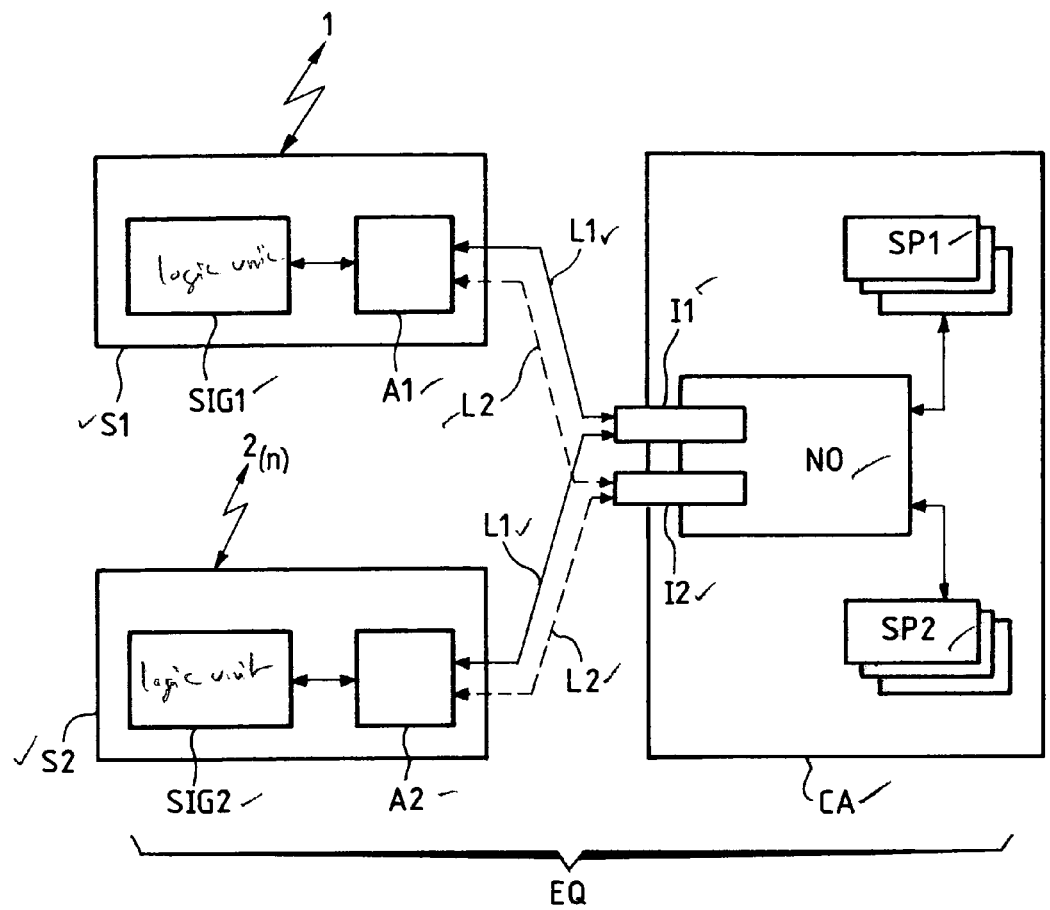
FIG_3

TELECOMMUNICATIONS EQUIPMENT

The invention relates to telecommunications equipment and in particular to switching center call control equipment.

BACKGROUND OF THE INVENTION

FIG. 1 is a diagram which summarizes the architecture of a telecommunications network enabling a telecommunications terminal TE1 to communicate with a terminal TE2.

An equipment TE1 is connected to a switch SW1 of an operator O1. The switch SW1 is connected to a switch SW2 of the same operator, for example, which is connected to a switch SW3 of an operator O2. A terminal TE2 is connected to the switch SW3.

Accordingly, calls between the terminals TE1 and TE2 are processed by telecommunications equipments for which the signaling standards are not necessarily the same.

Switching centers (also referred to as switches) such as the equipments SW1, SW2, SW3 are therefore provided in the network. In practice there is no reason for them to be from the same supplier or operator. Thus the network can route data streams, voice streams and control streams.

The control stream is concerned with call protocols. For call protocols there are several standards, including the B-ISUP standard of the International Telecommunication Union (ITU), the PNNI standard of the ATM (Asynchronous Transmission Mode) Forum and the SS7 standard of the European Telecommunications Standards Institute (ETSI).

The architecture of a switching center (also referred to as a switch) comprises various S1 modules, including:
- a signaling processing module
- a call control module CA, S1, S2, S3 and
- a resource management module CR allocating channels via physical links.

In practice, the signaling module of a switch implements the call protocol which enables it to communicate with another switch.

The call control module CA is the core of the system. It is an automaton which creates a process for each type of call received.

In practice, the call control module creates a process to handle the call when a line goes to the off-hook condition for a telephone call.

To this end, a generic process (also referred to as a program) is provided in the module and is adapted to create another process to handle the call.

As there are several signaling standards, the same equipment can include different signaling modules conforming to different signaling standards.

The above architecture is shown diagrammatically in FIG. 2. Signaling modules S1, S2, S3 conforming to the three standards that exist at present are installed in a switch SW2 and connected to the core, i.e. to the call handling module CA.

This problem is relatively new, but is becoming more difficult to solve because new operators can come into play and because it may be desirable to modify existing standards.

Accordingly, each time that a new standard appears, the equipment must evolve to take account of it.

OBJECT AND SUMMARY OF THE INVENTION

The object of the invention is to reduce the impact of new signaling on call control and to that end to render call control as autonomous as possible.

For example, in PNII, when the call control module sends a request, the request can be accepted before the dialed number is analyzed, whereas in B-ISUP the request is hot accepted until the dialed number has been analyzed.

The present invention provides a solution by proposing an architecture that can be adapted to new standards or that can easily cause the existing standards to evolve.

The invention applies in particular to 2M–144 Mbit/s broadband transmission (ATM, video) but also to narrow-band (64 kbit/s) transmission.

The invention provides a generic call control module CA capable of processing requests common to the various standards and dedicated modules or components capable of processing requests specific to each standard in order to reduce the impact of new signaling on the call control module in order to render it as autonomous as possible.

The invention provides equipment including a service unit wherein the service unit includes a driver core and modules connected to said core and adapted to process signaling and wherein said core (20) includes:
- receiving means for receiving signaling messages from one or more signaling networks, and
- sending means for sending said signaling messages to said modules in accordance with a predetermined rule.

In one embodiment of the invention, the core includes means for processing certain signaling messages.

The means for receiving signaling messages include a high-level interface adapted to provide access to the core for processing of standard signaling messages by the core.

The means for receiving signaling messages include a low-level interface adapted to provide access to the module adapted to process a received specific signaling message.

BRIEF DESCRIPTION OF THE DRAWINGS

Other features and advantages of the invention will become clearly apparent on reading the following description, which is given by way of non-limiting example only and with reference to the drawings, in which:

FIG. 1 is a block diagram of a telecommunications network,

FIG. 2 is a diagram of a prior art equipment architecture, and

FIG. 3 is a diagram of a telecommunications equipment architecture of the invention.

MORE DETAILED DESCRIPTION

For simplicity, the embodiment described hereinafter is an architecture with two signaling standards corresponding to signaling networks 1 and 2 and signaling modules S1 and S2. Of course, the invention applies with advantage to situations in which there are more than two signaling standards, in concrete terms signaling networks 1 to n and signaling modules S1 to Sn.

The telecommunications equipment EQ provides the required service or services on receiving messages from any one of signaling networks 1 to n.

To this end, the equipment includes signaling modules S1–S2 capable of receiving signals from corresponding signaling modules of equipments EQ, not shown.

Each module S1, S2 holds the signaling information of the corresponding standard 1, 2 in a respective logic unit SIG1, SIG2. Each unit is connected to an adapter, namely an adapter A1 for the unit SIG1 and an adapter A2 for the unit SIG2, and, for the purposes of dialogue with the service unit CA, which in practice is a call control module, the adapters can convert requests conforming to each standard (or a new standard) into standard requests.

Because the dialogue with the service unit CA is standardized, the adapter interfaces A1, A2 are used for the dialogue. They are in practice logic interfaces enabling presentation (as symbolized by links L1) of all calls to the service unit CA in the same format, namely the standard dialogue format, regardless of the nature of the signaling and whether the signaling corresponds to a new standard or not.

The links L2 shown in dashed line in FIG. 3 correspond to "hook" functions present in the service unit CA for addressing specific functions (for example generic functions, a function pointer).

The generic requests L1 are managed by a particular high-level generic interface I1 and the "hook" functions L2 are managed by a particular low-level interface I2 that also provides access to the specific modules SP1, SP2 of the unit CA if specific requests arrive (such requests being tied to a new standard and not conforming to a generic formulation that can be processed by the generic call management driver core NO).

The interfaces I1 and I2 for dialogue with the service unit exist and consequently are already defined.

In practice, 80% of requirements common to all the standards can be covered by the interface I1 and processed by the core NO, and requests that do not conform to a generic formulation are wrapped in the standard CA unit dialogue format by the adapters A1 and A2 so that they can be recognized by the interface I2 and processed by the appropriate specific module SP1 or SP2. The appropriate specific module can be determined by applying predetermined rules. These rules can simply consist of determining the standard to which the request conforms.

The core NO is therefore adapted to process all generic requests common to the various standards.

The specific modules SP1, SP2 each implement specific features corresponding to the evolution of an existing standard or a new standard outside the generic framework.

What is claimed is:

1. Telecommunications equipment including a service unit for communicating with one or more signaling networks, wherein said service unit includes a driver core, and modules connected to said core and processing specific requests, and wherein said core includes:
   receiving means for receiving signaling messages corresponding to generic or specific requests;
   sending means for sending specific requests to said modules in accordance with a predetermined rule; and
   processing means for processing said generic requests.

2. Equipment according to claim 1, wherein said receiving means include:
   a high-level interface for receiving signaling messages corresponding to generic requests from one or more signaling networks; and
   a low-level interface for receiving signaling messages corresponding to specific requests from one or more signaling networks.

* * * * *